United States Patent
Cho et al.

(10) Patent No.: US 8,670,101 B2
(45) Date of Patent: Mar. 11, 2014

(54) DISPLAY DEVICE

(75) Inventors: Yun-Jung Cho, Asan-si (KR);
Seong-Young Lee, Anyang-si (KR);
Sahng-Ik Jun, Yongin-si (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 965 days.

(21) Appl. No.: 12/471,902

(22) Filed: May 26, 2009

(65) Prior Publication Data

US 2010/0013743 A1    Jan. 21, 2010

(30) Foreign Application Priority Data

Jul. 18, 2008   (KR) .................. 10-2008-0070240

(51) Int. Cl.
*G02F 1/1345*    (2006.01)
(52) U.S. Cl.
USPC ........................................... 349/152
(58) Field of Classification Search
USPC .......................... 349/151, 150, 152
See application file for complete search history.

(56) References Cited

U.S. PATENT DOCUMENTS

| | | | |
|---|---|---|---|
| 5,737,053 A * | 4/1998 | Yomogihara et al. | 349/149 |
| 6,407,796 B2 * | 6/2002 | Tajima et al. | 349/150 |
| 7,095,476 B2 * | 8/2006 | Lo et al. | 349/150 |
| 7,408,612 B2 * | 8/2008 | Hirosue et al. | 349/151 |

* cited by examiner

*Primary Examiner* — James Dudek
(74) *Attorney, Agent, or Firm* — F. Chau & Associates, LLC

(57) ABSTRACT

A display device according to an exemplary embodiment of the present invention includes: a substrate, a plurality of gate lines formed on the substrate, a plurality of data lines formed on the substrate, a plurality of switching elements connected to the gate lines and the data lines, a plurality of clock signal transmitting lines formed on the substrate, and a gate driver connected to the gate lines and the clock signal transmitting lines. A direction of each of the clock signal transmitting lines is changed approximately ninety degrees in a first region and a second region. The regions are disposed between an edge of the substrate and the gate driver. A symmetry is present between portions of the clock signal transmitting lines arranged in the first region and the second region.

18 Claims, 4 Drawing Sheets

DISPLAY DEVICE

CROSS-REFERENCE TO RELATED APPLICATION

This application claims priority to Korean Patent Application No. 10-2008-0070240, filed in the Korean Intellectual Property Office, on Jul. 18, 2008, the disclosure of which is incorporated by reference herein.

BACKGROUND OF THE INVENTION (a) Technical Field

The present disclosure relates to a display device.

(b) Discussion of Related Art

An active matrix flat panel display may include a plurality of pixels for displaying images and a plurality of signal lines for transmitting signals. The signal lines may include gate lines for transmitting gate signals and data lines for transmitting data signals. The pixels may include a switching element for controlling a data signal according to a gate signal and an electric-optical element for converting an electric signal such as the data signal to an optical signal.

The flat panel display may include a gate driver for generating the gate signals, a data driver for generating the data signals, and a signal controller for controlling the gate and data signals. The gate driver may be made in an integrated circuit (IC) chip form. However the structure of the gate driver may be integrated with a display panel of the flat panel display along with the switching elements and the signal lines of the pixels. The signal controller may be mounted on a printed circuit board (PCB), and the data driver may be mounted on a flexible printed circuit film that is connected between the display panel and the printed circuit board (PCB).

A plurality of clock signals and a voltage may be required to generate the gate signal of the gate driver. Signal lines for transmitting these signals and the voltage may be formed on the display panel when the gate driver is integrated with the display panel such that these signals and the voltage supplied from the printed circuit board (PCB) are transmitted to the gate driver.

However, the clock signals may generate a load difference according to the signal transmitting lines, thereby generating optical deficiencies such as a horizontal line defect.

Thus, there is a need for a display device that reduces optical deficiencies, such as horizontal line defects.

SUMMARY OF THE INVENTION

A display device according to an exemplary embodiment of the present invention includes: a substrate, a plurality of gate lines formed on the substrate, a plurality of data lines formed on the substrate, and intersecting and insulated from the gate lines, a plurality of switching elements connected to the gate lines and the data lines, a plurality of clock signal transmitting lines formed on the substrate and separated from the gate lines and the data lines, and a gate driver connected to the gate lines and the clock signal transmitting lines. A direction of each of the clock signal transmitting lines is changed by approximately ninety degrees in a first region and a second region. The regions are disposed between an edge of the substrate and the gate driver. A symmetry is present between portions of the clock signal transmitting lines arranged in the first region and the second region.

The lengths and widths of each of the clock signal transmitting lines may be substantially the same between the edge of the substrate and an ending position of the second region. The distances between each of the clock signal transmitting lines disposed in the first region may be substantially the same as one another. Each switching element may include one of a liquid crystal capacitor, an organic light emitting diode, or an electrophoretic capacitor. The processing direction of each of the clock signal transmitting lines may be changed through two steps totaling a right angle in the first region and the second region, respectively.

Each of clock signal transmitting lines may include an oblique portion in each of the first region and the second region, the widths of the oblique portions of the clock signal transmitting lines may be substantially the same in the first region and the second region. Sums of the lengths of the oblique portions for each clock signal transmitting line may be substantially the same in the first region and the second region.

Intervals between the oblique portions of the clock signal transmitting lines may be substantially uniform in the first region. Intervals between the oblique portions of the clock signal transmitting lines may be substantially uniform in the second region. The intervals between the oblique portions of the clock signal transmitting lines may be different in the first region and the second region.

The clock signal transmitting lines may further respectively include a first longitudinal portion in each of the first region and the second region. The widths of the longitudinal portions of the clock signal transmitting lines may be substantially the same in the first region and the second region. Sums of the lengths of the first longitudinal portions for each of the clock signal transmitting lines may be substantially the same in the first region and the second region.

The clock signal transmitting line may further respectively include a transverse portion connecting the first region and the second region. The widths of the transverse portions of the clock signal transmitting lines may substantially the same, and the intervals between the transverse portions of the clock signal transmitting lines may be substantially the same.

The clock signal transmitting lines may further respectively include a second longitudinal portion disposed outside the second region, connected to the first longitudinal portion, and having a wider width than the first longitudinal portion. The widths of the second longitudinal portions of the clock signal transmitting lines may be substantially the same. The intervals between the second longitudinal portions of the clock signal transmitting lines may be substantially the same.

The display device may further include a light blocking member overlapping all the second longitudinal portions of the clock signal transmitting lines. The display device may further include a liquid crystal layer formed on the substrate, and a sealant enclosing the liquid crystal layer. The sealant may overlap the entire transverse portion and the portion of the oblique portion of all clock signal transmitting lines. Each of the overlapping areas between the sealant and the clock signal transmitting lines may be substantially the same.

A substrate for a display device according to an exemplary embodiment of the present invention includes: a display panel portion, a plurality of data and gates lines, a plurality of clock signal transmitting lines, and a gate driver. The display panel portion is divided into a display area for displaying images and a peripheral area disposed outside the display area. The data lines intersect the gates lines. The plurality of clock signal transmitting lines are disposed in the peripheral area. The gate driver is formed in the peripheral area. The gate driver is connected to the gate lines and the clock signal transmitting lines. Each of the clock signal transmitting lines includes a first region and a second region. Each of the regions includes a substantially vertical portion, an oblique portion, and a substantially horizontal portion. The substrate may further include a plurality of switching elements connected to the gate lines and the data lines. Each switching element may include one of a liquid crystal capacitor, an organic light emitting diode, or an electrophoretic capacitor.

A direction of a portion of the clock signal transmitting lines entering the second region may differ by substantially ninety degrees as compared to a direction of a portion of the clock signal transmitting lines exiting the second region. A direction of a portion of the clock signal generating lines exiting the first region may be substantially the same as the direction of the portion of the clock signal transmitting lines entering the second region. The regions may be disposed between an edge of the substrate and the gate driver. The lengths and widths of each of the clock signal transmitting lines may be substantially the same between the edge of the substrate and a position of the clock signal transmitting lines exiting the second region. The portions of the clock signal transmitting lines within the first and second regions may be symmetrical. First distances between portions of each of the clock signal transmitting lines disposed in the first region may be substantially the same as one another. Second distances between portions of each of the clock signal transmitting lines disposed in the second region may be substantially the same as one another. The first distances may be smaller than the second distances.

DETAILED DESCRIPTION OF EXEMPLARY EMBODIMENTS

Figure 1:
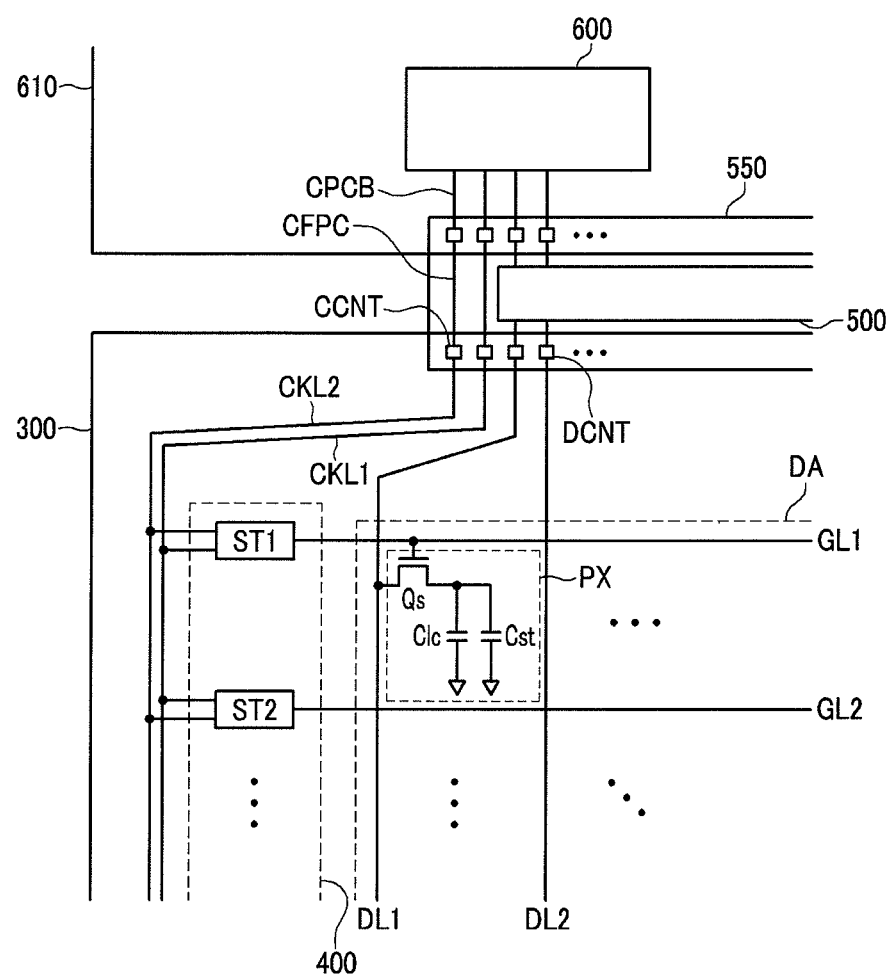
FIG. 1 is a schematic diagram of a liquid crystal display according to an exemplary embodiment of the present invention.

Hereinafter, exemplary embodiment of the present invention will be described more fully with reference to the accompanying drawings.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

A liquid crystal display according to an exemplary embodiment of the present invention will be described with reference to FIG. 1. FIG. 1 is a schematic diagram of a liquid crystal display according to an exemplary embodiment of the present invention. Referring to FIG. 1, a liquid crystal display according to an exemplary embodiment of the present invention includes a display panel portion 300, a printed circuit board (PCB) 610, a flexible printed circuit film (FPC) 550, and a data driver 500.

The display panel portion 300 may include two display panels (not shown) and a liquid crystal layer (not shown) interposed therebetween. The display panel portion 300 may be divided into a display area DA for displaying images and a peripheral area disposed outside the display area DA.

A plurality of pixels PX may be arranged with a substantially matrix form in the display area DA. Each pixel may include a switching element Qs, and a liquid crystal capacitor Clc and a storage capacitor Cst connected to the switching element Qs. When a flat panel display other than a liquid crystal display is used, each pixel PX may include a different electro-optical element to replace the liquid crystal capacitor Clc. For example, the electro-optical element may include an organic light emitting diode (OLED) when an organic light emitting device is used, or the electro-optical element may include an electrophoretic capacitor when an electrophoretic display is used.

A plurality of signal lines connected to the switching element Qs are formed in the display area DA. For example, a plurality of gate lines GL1 and GL2 and a plurality of data lines DL1 and DL2 are formed and may extend outside the display area DA to the peripheral area. The gate lines GL1 and GL2 may extend in a row direction, and the data lines DL1 and DL2 may extend in a column direction. While FIG. 1 illustrates two gate and data lines, embodiments of the present invention are not limited thereto. For example, the display area DA may include more than two gate and data lines.

A gate driver 400, which is connected to the gate lines GL1 and GL2, is formed in part of the peripheral area. The gate driver 400 may include a plurality of stages ST1 and ST2 that are sequentially arranged. The stages ST1 and ST2 are respectively connected to the gate lines GL1 and GL2 to respectively generate gate signals.

Each of the stages ST1 and ST2 may generate a gate signal based on two clock signals having a phase difference of about 180 degrees. The clock signals may be transmitted to the gate driver 400 through clock signal transmitting lines CKL1 and CKL2 formed in the display panel portion 300. The gate signals may have a high voltage during a predetermined period determined by the clock signals. The periods of the high voltages of the gate signals may be configured by the clock signals to prevent them from overlapping. However when the number of gate lines GL1 and GL2 is large, the periods of the high voltages may overlap each other. When the periods of the high voltage overlap, more than two clock signals may be required, and the number of clock signal transmitting lines CKL1 and CKL2 may be more than two.

The data driver 500 may be mounted in a chip form on the flexible printed circuit film 550. The data driver 500 is electrically connected to the data lines DL1 and DL2 of the display panel portion 300. However, the data driver 500 may be also integrated with the display panel portion 300.

A signal controller 600 may be mounted in a chip form on the printed circuit board (PCB) 610. The signal controller 600 generates a signal such as a clock signal for controlling the gate driver 400, and a signal for controlling the data driver 500. The signal controller 600 may receive image signals from an external source and processes them to provide them as digital signals to the data driver 500. The data driver 500 converts the digital signals into analog data signals to apply to the data lines DL1 and DL2. The signal controller 600 and the data driver 500 may be embodied as a single chip.

The flexible printed circuit film 550 may be attached to the display panel portion 300 and the printed circuit board (PCB) 610. The flexible printed circuit film 550 is a transmitting path between the display panel portion 300 and the printed circuit board (PCB) 610, between the display panel portion 300 and the data driver 500, and between the data driver 500 and the printed circuit board (PCB) 610.

Signal transmitting lines CPCB and CFPC for transmitting the signals are formed in the printed circuit board (PCB) 610 and the flexible printed circuit film 550. A plurality of contact portions for connecting the signal transmitting lines CPCB and CFPC to each other are formed in the printed circuit board (PCB) 610, the flexible printed circuit film 550, and the display panel portion 300. For example, contact portions DCNT for the connection between the data lines DL1 and DL2, and the signal transmitting line CFPC, and contact portions CCNT for the connection between the clock signal transmitting lines CKL1 and CKL2, and the signal transmitting lines CFPC, are formed in the display panel portion 300 and the flexible printed circuit film 550. The signal transmitting lines CFPC connected to the clock signal transmitting lines CKL1 and CKL2 may be formed on an additional flexible printed circuit film on which the data driver 500 is not mounted.

The area of the flexible printed circuit film 550 may be smaller than the area of the display panel portion 300 such that the interval between the data lines DL1 and DL2 is decreased close to the contact portions DCNT, thereby forming a fan shape. The clock signal transmitting lines CLK1 and CLK2 mainly extend in a column direction. However, a portion of the clock signal transmitting lines CLK1 and CL2 has a bent or curved shape to contact the contact portions CCNT.

Figure 2:
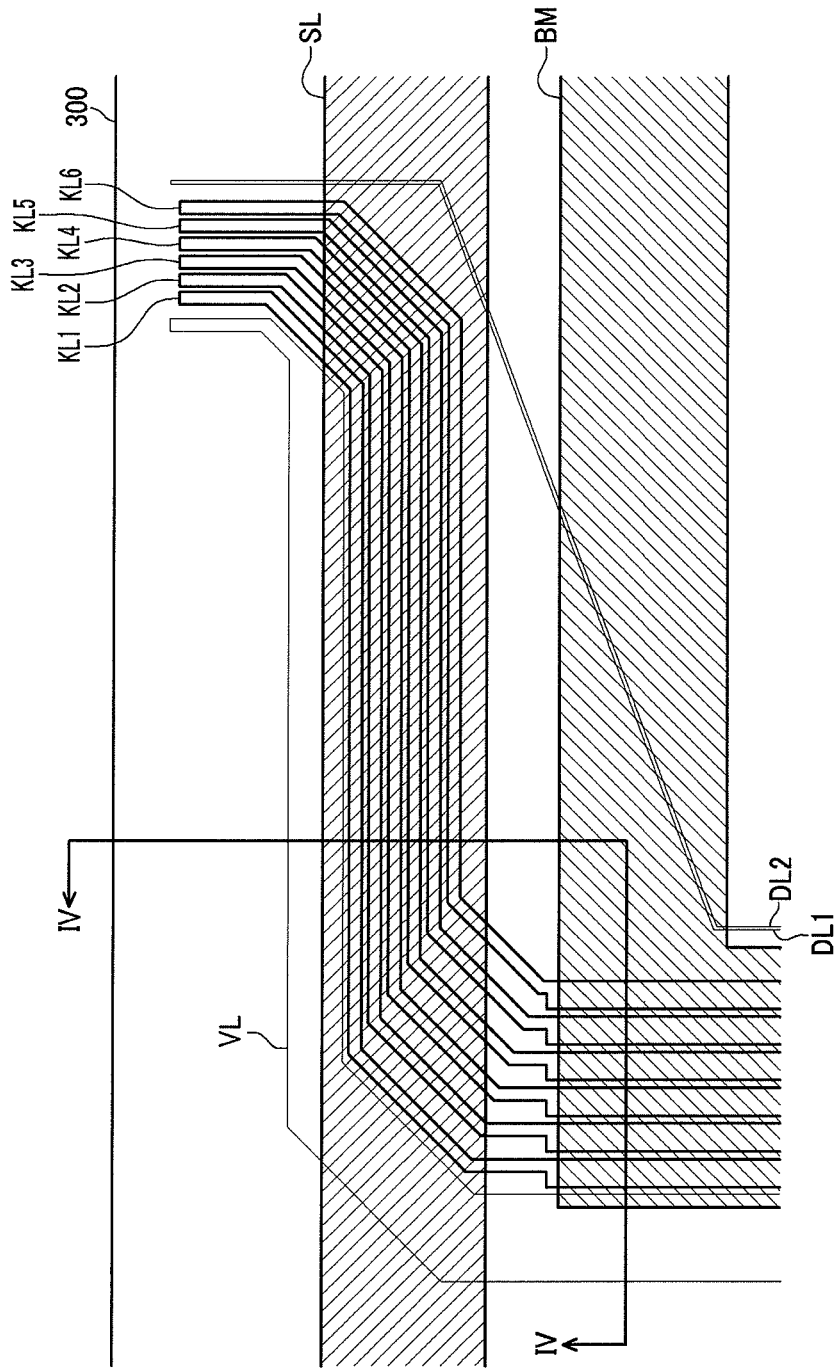
FIG. 2 is a layout view of a peripheral area in the display panel portion according to an exemplary embodiment of the present invention.
Figure 3:
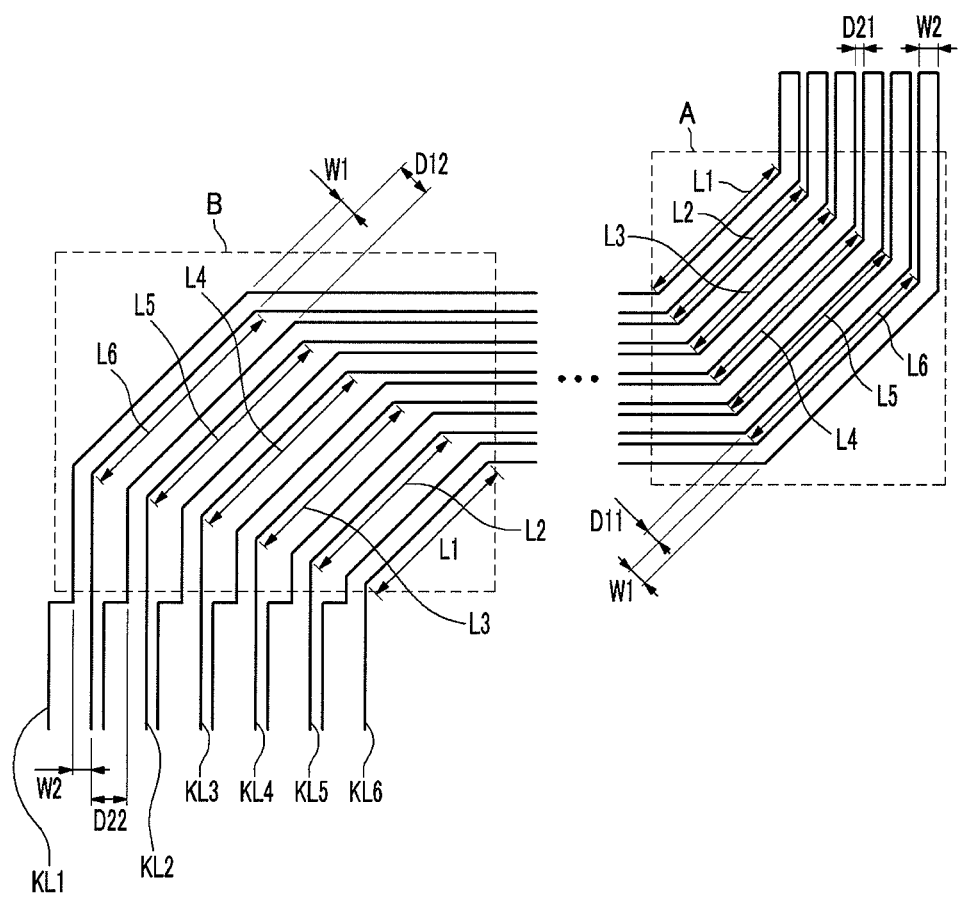
FIG. 3 is an enlarged view of clock signal transmitting lines shown in FIG. 2.
Figure 4:
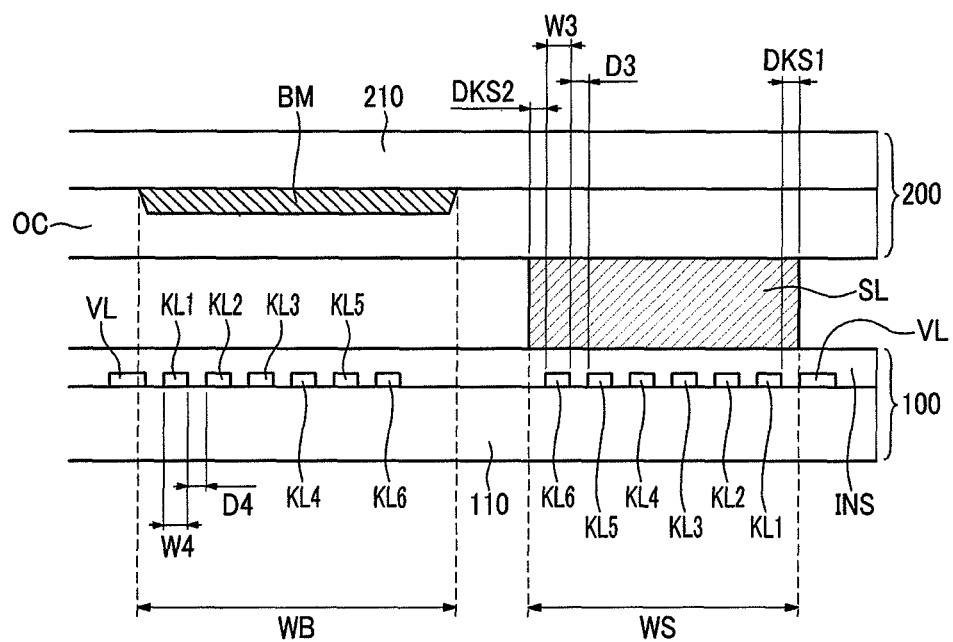
FIG. 4 is a cross-sectional view of the display panel portion shown in FIG. 2 taken along the line IV-IV.

FIG. 2 is a layout view of a peripheral area in the display panel portion according to an exemplary embodiment of the present invention, FIG. 3 is an enlarged view of clock signal transmitting lines shown in FIG. 2, and FIG. 4 is a cross-sectional view of the display panel portion shown in FIG. 2 taken along the line IV-IV.

Referring to FIG. 4, the display panel portion 300 of the liquid crystal display according to an exemplary embodiment of the present invention includes a lower panel 100 and an upper panel 200 that are opposite to each other with a gap interposed therebetween, and a sealant SL of width WS is formed between the two display panels 100 and 200. The display panel portion 300 further includes a liquid crystal layer (not shown) in the space enclosed by the sealant SL.

The lower panel 100 includes a substrate 110 and a thin film structure formed thereon. The thin film structure of the lower panel 100 includes the switching element Qs as a thin film transistor, the gate lines GL1 and GL2, the data lines DL1 and DL2, a pixel electrode (not shown) that is one electrode of the liquid crystal capacitor Clc, the storage capacitor Cst, the gate driver 400, the clock signal transmitting lines KL1, KL2, KL3, KL4, KL5 and KL6, one or more voltage transmitting lines VL, and an insulating layer INS.

The upper panel 200 includes a substrate 210 and a thin film structure formed thereon. The thin film structure of the upper panel 200 includes a light blocking member BM of width WB, an overcoat OC, and a common electrode (not shown) that is the other electrode of the liquid crystal capacitor Clc. The common electrode may be formed on the lower panel 100.

Referring to FIG. 2 and FIG. 3, the clock signal transmitting lines KL1-KL6 according to at least one exemplary embodiment are shaped such that they extend downward in a substantially column direction from a contact portion disposed on an upper edge of the display panel portion 300, extend in acurve or a bent direction downward to the left, extend in a substantially row direction to the left, extend again in a curved or bent direction downward to the left, and again extend downward in a substantially column direction. The bent or curved portions of the clock signal transmitting lines KL1-KL6 may be respectively formed in an A region and a B region as shown in FIG. 3. The clock signal transmitting lines KL1-K16 may be bent or curved in a two step process such that the direction of a portion of the lines is changed by a total of about 90 degrees. For example, the clock signal transmitting lines KL1-KL6 may be curved or bent at an oblique angle to a row/column direction, and again curved or bent at the oblique angle to a column/row direction.

In at least one embodiment of the present invention, the clock signal transmitting lines KL1-KL6 are symmetrical to each other in the A region and the B region. For example, if the lengths of the oblique portions of the clock signal transmitting lines KL1-KL6 are sequentially referred to as L1, L2, L3, L4, L5, and L6 from the KL1 line disposed in the innermost side to the KL6 line disposed at the outermost side in the A region, the KL6 line is located at the innermost side, the KL1 line is located in the outermost side, and the length of the oblique portions are sequentially L6, L5, L4, L3, L2, and L1 from the KL1 line to the KL6 line in the B region. Further, the sum of the lengths of the oblique portions of each of the clock signal transmitting lines KL1-KL6 are substantially the same in the A region and the B region. For example, L1+L6=L2+L5=L3+L4. In the A region and the B region, the width W1 of the oblique portions of the clock signal transmitting lines KL1-KL6 are substantially the same. However, the interval between the oblique portions of the clock signal transmitting lines KL1-KL6 may be different from each other in the A region and the B region. For example, the interval D11 of the oblique portion of the clock signal transmitting lines KL1-KL6 in the A region may be smaller than the interval D12 of the oblique portions of the clock signal transmitting lines KL1-KL6 in the B region. However, the interval D11 of the oblique portion of the clock signal transmitting lines KL1-KL6 is substantially uniform in the A region, and the interval D12 of the oblique portions of the clock signal transmitting lines KL1-KL6 is substantially uniform in the B region.

Further, the width W2 of the longitudinal portion of each of the clock signal transmitting lines KL1-KL6 are substantially the same in the A region and the B region. However, the interval of the longitudinal portions of each of the clock signal transmitting lines KL1-KL6 may be different in the A region and the B region. For example, the interval D21 of the longitudinal portion of the clock signal transmitting lines KL1-KL6 in the A region may be smaller than the interval D22 of the longitudinal portions of the clock signal transmitting lines KL1-KL6 in the B region. However, the interval D21 of the longitudinal portions of the clock signal transmitting lines KL1-KL6 is substantially uniform in the A region, and the interval D22 of the longitudinal portions of the clock signal transmitting lines KL1-KL6 is substantially uniform in the B region.

Since the intervals D11 and D21 between the clock signal transmitting lines KL1-KL6 in region A may differ respectively with the intervals D12 and D22 in between the clock signal transmitting lines KL1-KL6 in region B, the width of the lower portion in the B region should be wide enough to reduce the resistance of the clock signal transmitting lines KL1-KL6. However it may be difficult to sufficiently increase the width in the contact portion CCNT within the available space to attach the flexible printed circuit film 550.

The lengths of transverse portions of the clock signal transmitting lines KL1-KL6 between the A region and the B region are substantially the same. The sum of the lengths of the longitudinal portions in the A region is substantially the same as the sum of the lengths of the longitudinal portions in the B region. The width W3 of the traverse portions of the clock signal transmitting lines KL1-K6 are substantially the same, and the interval D3 therebetween are substantially the same. Further, the portions of clock signal transmitting lines KL1-KL6 passing through the B region and the width thereof starts to widen at the same positions in the vertical direction, and the width W4 of these portions are substantially the same and the intervals D4 therebetween are substantially the same.

Accordingly, the resistance of the clock signal transmitting lines KL1-KL6 and the load between the clock signal transmitting lines KL1-KL6 may be substantially the same such that the deviation of the clock signals transmitted through the clock signal transmitting lines KL1-KL6 may be reduced.

A portion of the oblique portions of the clock signal transmitting lines KL1-KL6 and the entire transverse portion thereof may overlap the sealant SL, as shown in FIG. 2 and FIG. 4. The distance DKS1 between the upper boundary of the transverse portion of the uppermost clock signal transmitting line KL1 and the upper boundary of the sealant SL may be substantially the same as the distance DKS2 between the lower boundary of the transverse portion of the lowermost clock signal transmitting line KL6 and the lower boundary of the sealant SL. Accordingly, two boundaries of the sealant SL pass through a symmetry point between the A region and the B region such that the overlapping areas between the sealant SL and the clock signal transmitting lines KL1-KL6 are substantially the same.

Accordingly, the load applied to the clock signal transmitting lines KL1-KL6 by the overlapping between the clock signal transmitting lines KL1-KL6 and the sealant SL may be substantially the same such that deviation of the clock signals transmitted through the clock signal transmitting lines KL1-KL6 is reduced.

A wide portion of the longitudinal portions of the clock signal transmitting lines KL1-KL6 overlaps the light blocking member BM, as shown in FIG. 2 and FIG. 4. Overlapping areas between the light blocking member BM and each of the clock signal transmitting lines KL1-KL6 may be substantially the same. Therefore, the load of the clock signal transmitting lines KL1-KL6 due to the overlap between the clock signal transmitting lines KL1-KL6 and the light blocking member BM may be substantially the same such that the deviation between the clock signals to be transmitted through the clock signal transmitting lines KL1-KL6 is reduced.

The shape of the voltage transmitting lines VL may be similar to the shape of the clock signal transmitting lines KL1-KL6. However because it is not necessary to control the balance between the voltage transmitting lines VL like the clock signal transmitting lines KL1-KL6, the width of the voltage transmitting lines VL may be designed without consideration of the symmetry.

Embodiments of the present invention may be applied to various flat panel displays having a gate driver, as well as those including a liquid crystal display. Embodiment of present invention may also be applied when the gate driver is mounted in a chip form on a display panel portion or a flexible printed circuit film attached to the display panel, as well when the gate driver is integrated with the display panel portion.

Having described exemplary embodiments of the invention, it is to be understood that the invention is not limited to the disclosed embodiments, but, on the contrary, is intended to cover various modifications and equivalent arrangements included within the spirit and scope of the disclosure.

What is claimed is:

1. A display device comprising:
a substrate;
a plurality of gate lines formed on the substrate;
a plurality of data lines formed on the substrate, wherein the data lines intersect the gates lines and are insulated from the gate lines;
a plurality of switching elements connected to the gate lines and the data lines;
a plurality of clock signal transmitting lines formed on the substrate and separated from the gate lines and the data lines; and
a gate driver connected to the gate lines and the clock signal transmitting lines,
wherein a direction of each of the clock signal transmitting lines is changed by approximately ninety degrees in a first region firstly and is changed by approximately ninety degrees in a second region secondly,
wherein the first and second regions are disposed between an edge of the substrate and the gate driver, and
wherein the arrangement of portions of the clock signal transmitting lines disposed in the first region and the arrangement of portions of the clock signal transmitting lines disposed in the second region have a symmetry,
wherein each of the clock signal transmitting lines includes an oblique portion in each of the first region and the second region,
wherein widths of the oblique portions of the clock signal transmitting lines are the same in the first region and the second region, and
wherein sums of lengths of the oblique portion for each of the clock signal transmitting lines is the same in the first region and the second region.

2. The display device of claim 1, wherein the symmetry includes lengths and widths of each of the clock signal transmitting lines that are substantially the same between the edge of the substrate and an ending position of the second region.

3. The display device of claim 2, wherein each switching element includes one of a liquid crystal capacitor, an organic light emitting diode, or an electrophoretic capacitor.

4. The display device of claim 2, wherein the direction of each of the clock signal transmitting lines is changed through two steps totaling a right angle in the first region and the second region, respectively.

5. The display device of claim 1, wherein:
intervals between the oblique portions of the clock signal transmitting lines are substantially uniform in the first region;
intervals between the oblique portions of the clock signal transmitting lines are substantially uniform in the second region; and
the intervals between the oblique portions of the clock signal transmitting lines are different from each other in the first region and the second region.

6. The display device of claim 5, wherein:
each of the clock signal transmitting lines in the first region and the second region further respectively include a substantially first longitudinal portion;
widths of the first longitudinal portions of the clock signal transmitting lines are substantially the same as one another in the first region and widths of the first longitudinal portions of the clock signal are substantially the same as one another in the second region; and
sums of lengths of the first longitudinal portions for each of the clock signal transmitting lines in the first region are the same as sums of lengths of the first longitudinal portions for each of the clock signal transmitting lines in the second region.

7. The display device of claim 6, wherein:
the clock signal transmitting lines further respectively includes a transverse portion connecting the first region and the second region;
the widths of the transverse portions of the clock signal transmitting lines are substantially the same; and
intervals between the transverse portions of the clock signal transmitting lines are substantially the same.

8. The display device of claim 7, wherein: the clock signal transmitting lines further respectively include a second longitudinal portion disposed outside the second region, connected to the first longitudinal portion, and having a wider width than the first longitudinal portion, the widths of the second longitudinal portions of the clock signal transmitting lines are substantially the same, and intervals between the second longitudinal portions of the clock signal transmitting lines are substantially the same.

9. The display device of claim 8, further comprising a light blocking member overlapping all the second longitudinal portions of the clock signal transmitting lines.

10. The display device of claim 9, further comprising:
a liquid crystal layer formed on the substrate; and
a sealant enclosing the liquid crystal layer, wherein the sealant overlaps the entire transverse portions and a portion of the oblique portions of the clock signal transmitting lines.

11. The display device of claim 8, further comprising:
a liquid crystal layer formed on the substrate; and a sealant enclosing the liquid crystal layer,
wherein the sealant overlaps the entire transverse portions and a portion of the oblique portions of the clock signal transmitting lines.

12. The display device of claim 11, wherein areas of each of the clock signal transmitting lines that overlap with the sealant are substantially the same.

13. A substrate for a display device, wherein the substrate comprises:
a display panel portion divided into a display area for displaying images and a peripheral area disposed outside the display area;
a plurality of data and gates lines, wherein each of the data lines intersect the gates lines;
a plurality of clock signal transmitting lines disposed in the peripheral area;
a gate driver formed in the peripheral area,
wherein the gate driver is connected to the gate lines and the clock signal transmitting lines,
wherein each of the clock signal transmitting lines includes a first region and a second region, and each of the clock signal transmitting lines includes a substantially vertical portion, an oblique portion, and a substantially horizontal portion in each of the first region and the second region, and
wherein first distances between oblique portions of each of the clock signal transmitting lines disposed in the first region are substantially the same as one another, second distances between oblique portions of each of the clock signal transmitting lines disposed in the second region are substantially the same as one another, and the first distances are smaller than the second distances.

14. The substrate of claim 13, wherein a direction of a portion of the clock signal transmitting lines entering the second region differs by substantially ninety degrees as compared to a direction of a portion of the clock signal transmitting lines exiting the second region and a direction of a portion of the clock signal generating lines exiting the first region is substantially the same as the direction of the portion of the clock signal transmitting lines entering the second region.

15. The substrate of claim 14, wherein the regions are disposed between an edge of the substrate and the gate driver.

16. The substrate of claim 15, wherein lengths and widths of each of the clock signal transmitting lines are substantially the same between the edge of the substrate and a position of the clock signal transmitting lines exiting the second region.

17. The substrate of claim 13, wherein the portions of the clock signal transmitting lines within the first and second regions are symmetrical.

18. The substrate of claim 13, further comprising a plurality of switching elements connected to the gate lines and the data lines, wherein each switching element includes one of a liquid crystal capacitor, an organic light emitting diode, or an electrophoretic capacitor.

* * * * *